Feb. 2, 1943.  L. T. H. GREIG  2,310,073
PIPE COUPLING
Filed Dec. 19, 1941  4 Sheets-Sheet 1
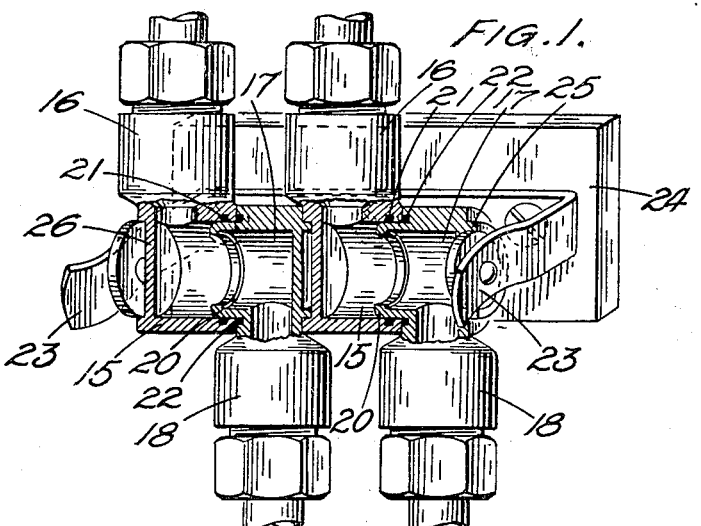
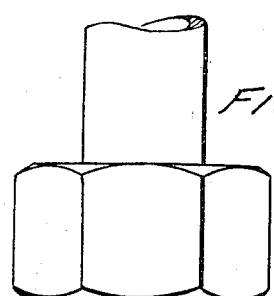
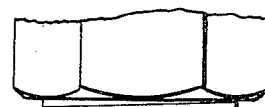
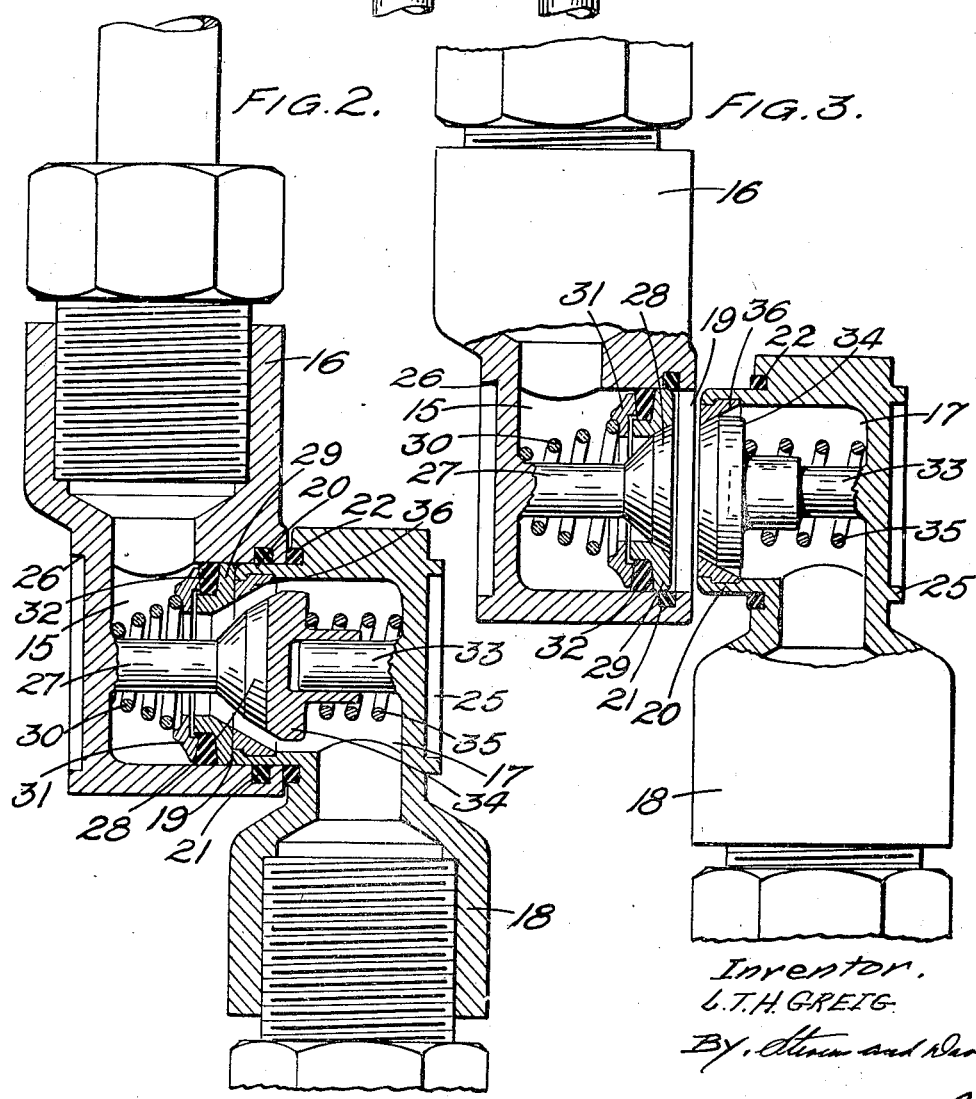
Inventor.
L. T. H. GREIG.

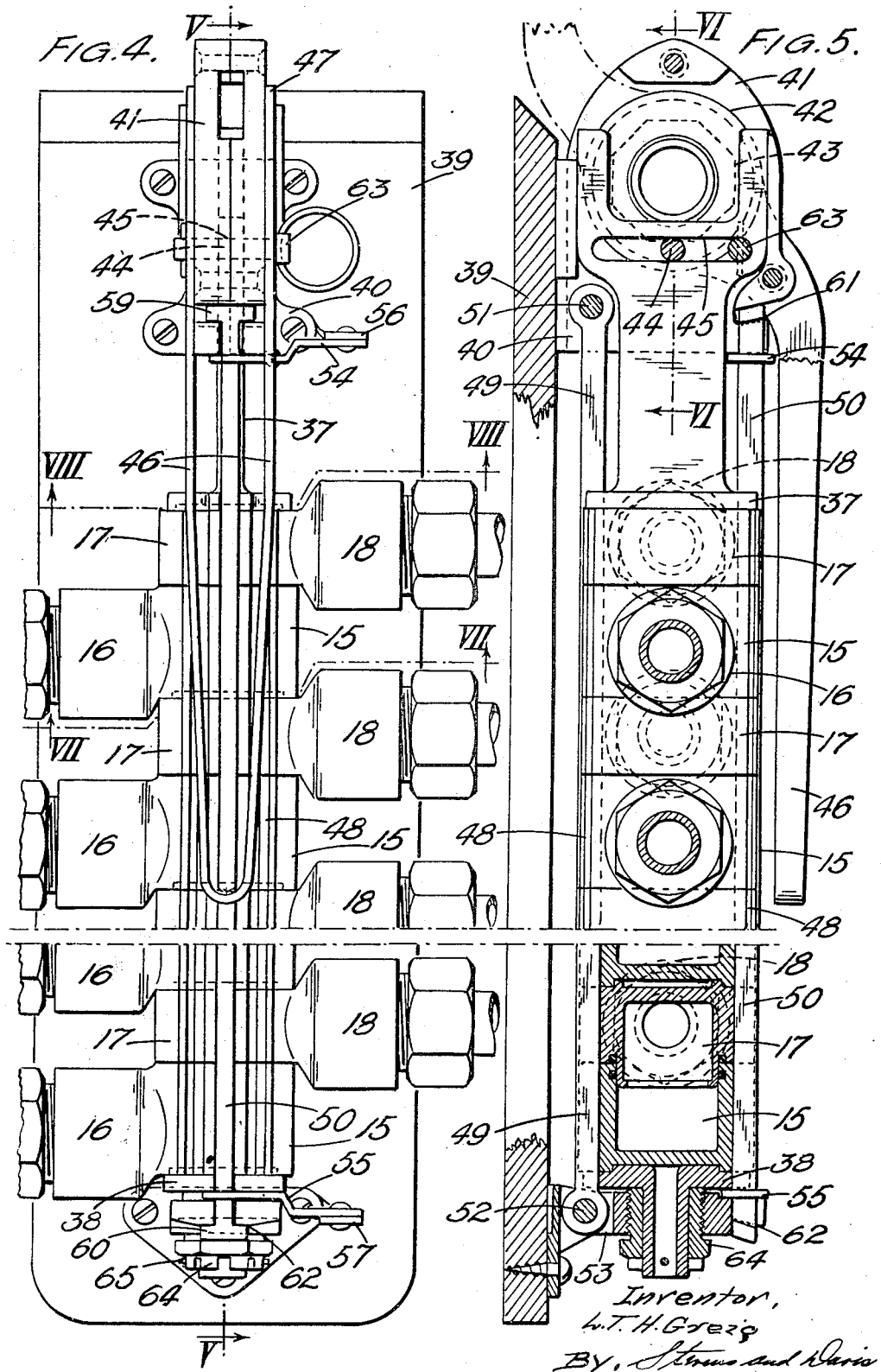

Feb. 2, 1943. L. T. H. GREIG 2,310,073
PIPE COUPLING
Filed Dec. 19, 1941 4 Sheets-Sheet 3
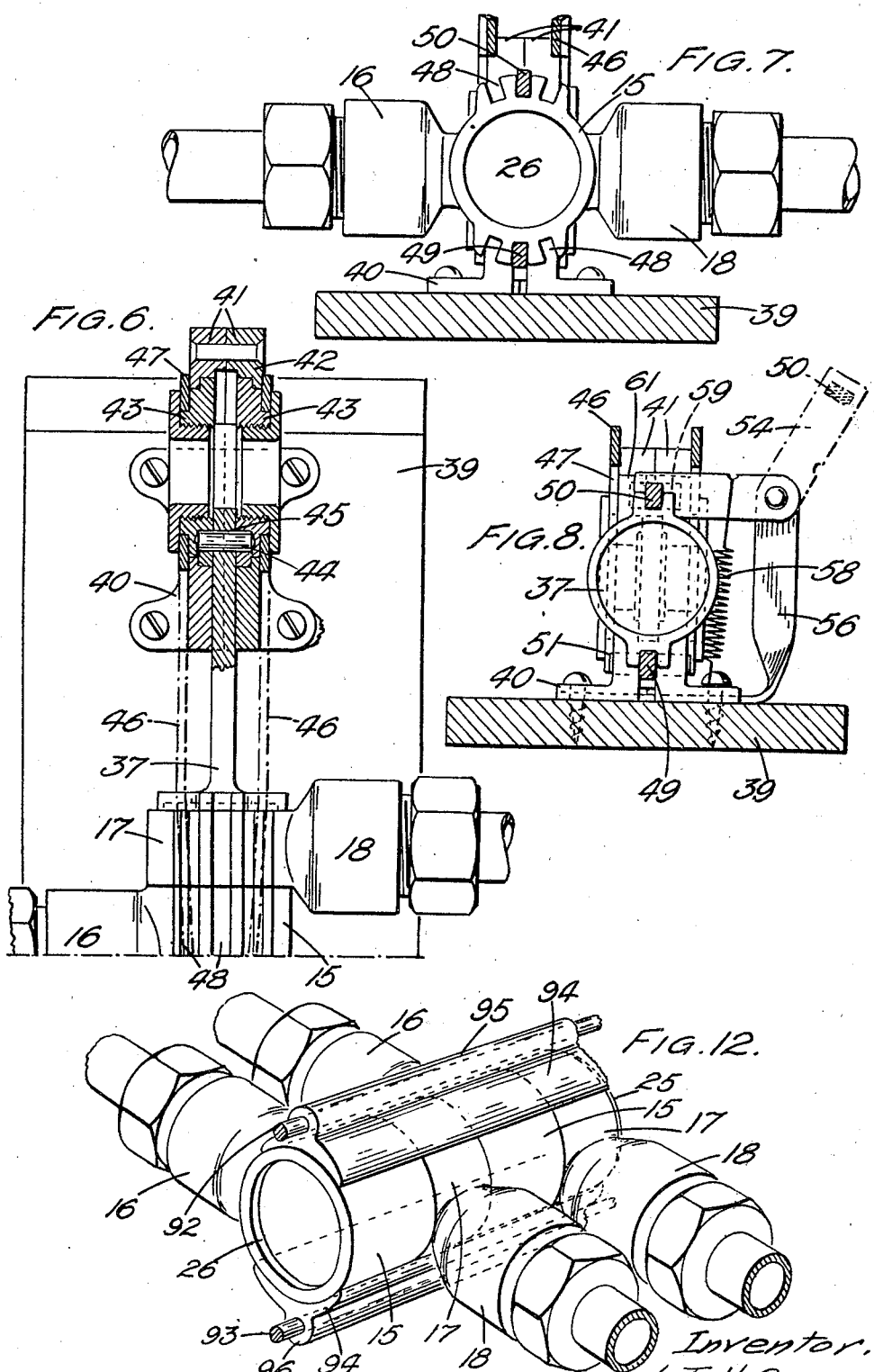

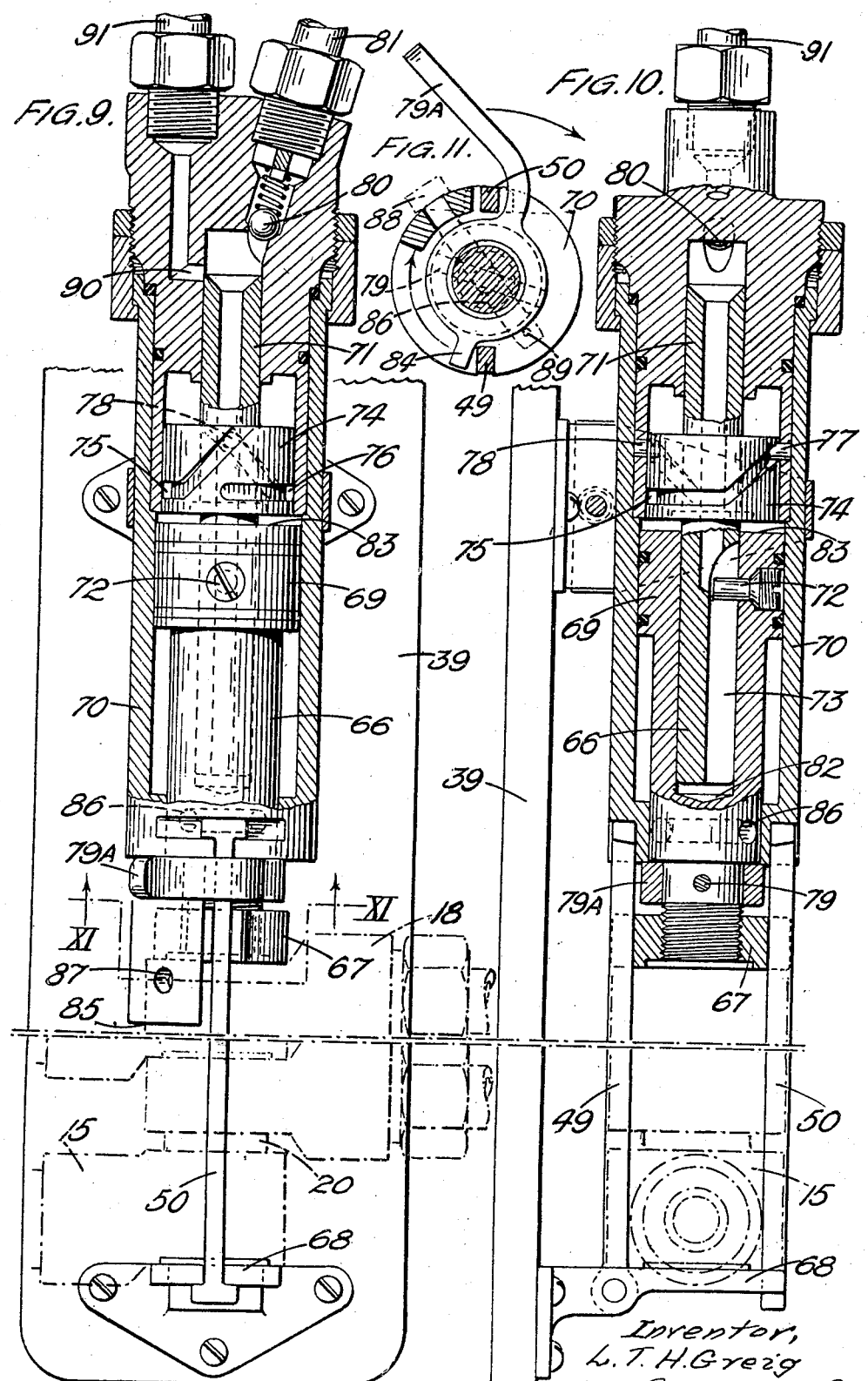

Patented Feb. 2, 1943

2,310,073

UNITED STATES PATENT OFFICE 2,310,073

PIPE COUPLING

Louis Thomas Hutchison Greig, Nazeing, England

Application December 19, 1941, Serial No. 423,673
In Great Britain December 5, 1940

9 Claims. (Cl. 284—17)

This invention relates to pipe couplings.

The invention consists in a pipe coupling comprising separable sections each constituted by a hollow fitting for the reception of a pipe connection and having an axial throat part extending therefrom and interfitting in an assembled condition to provide effective sealing whilst permitting fluid flow through the coupling, and means for clamping the sections together. The sealing is preferably provided by a resilient packing ring which in an assembled condition of the coupling is squeezed between the end of a throat and an adjacent wall of the cooperating section.

In certain preferred constructions of the invention the coupling includes means to render it self-sealing so as to prevent material leakage on disconnection of the associated sections of a coupling; such self-sealing means possessing in themselves certain novel features of construction, as will be apparent from the ensuing description.

When fully applied the present invention includes, in addition to the coupling members per se, a readily-operable clamp which may be actuated quickly and easily to ensure engagement and disengagement at will of one or more couplings.

In cases where the associated fluid pressure system is working at such high pressure that engagement of associated sections of the coupling requires considerable effort, provision may be made to secure the interfitting sections in their interengaged relationship by fluid pressure means, fluid pressure being maintained within the jack to secure the associated sections of the coupling in their interengaged relationship. The fluid pressure employed for actuating the jack may be derived from an independent source, or it may be tapped off from the circuit with which the coupling is associated. If the jack-actuating pressure is tapped off from the circuit where a plurality of circuits are employed at different pressures, it is obvious that the jack will require to be associated with the circuit which is at highest pressure.

In order that it may be clearly understood and readily carried into effect, the invention is hereinafter described with reference to the accompanying diagrammatic drawings of which:

Figure 1 is a sectional view in perspective illustrating one very simple form of coupling according to the invention;

Figure 2 is a sectional elevation showing two fully-interengaged sections of a modified form of coupling which includes means operative to effect self-sealing (i. e. substantial loss of fluid) on separation of the sections;

Figure 3 is a sectional elevation corresponding to Figure 2 showing the self-sealing mechanism operative on disconnection of the two sections of the coupling;

Figure 4 is a plan view showing a plurality of couplings according to the invention engaged in a quick-operating clamp device;

Figure 5 is a section on the line V—V of Figure 4;

Figure 6 is a section on the line VI—VI of Figure 5;

Figure 7 is a section on the line VII—VII of Figure 4;

Figure 8 is a section on the line VIII—VIII of Figure 4;

Figures 9 and 10 are, respectively, a plan view partly in section and an elevation partly in section and corresponding thereto illustrating fluid-actuated jack means operable to effect clamping of the couplings in their fully-interengaged relationship;

Figure 11 is a section on the line XI—XI of Figure 9;

Figure 12 shows a method of adjustably locating the sections of the coupling alternative to that shown in Figure 7.

Referring first to Figure 1, it can for convenience be assumed that the hollow fittings 15 each embody an inlet pipe connection 16 and can thus be regarded as the inlet sections of the couplings. If that be so, the outlet section of each coupling is constituted by a hollow fitting 17 carrying an outlet pipe connection 18. The pipe connections 16 and 18 extend laterally of the fittings and adjacent fittings present to each other open throats 19 and 20 which interfit as shown; sealing against leakage in an assembled condition of the couplings being achieved by the resilient sealing washers 21 and 22, of which the former are located each in a groove of the outer throat 19 to have an interference fit with the periphery of the cooperating inner throat 20. The sealing washers 22 are each squeezed between adjacent faces of the cooperating sections. It will thus be seen that when fully engaged the fittings 15 and 17 are secured against lateral separation by virtue of the interengagement of the cooperating throats 19 and 20. The adjacent assembled coupling units of the assembled series are held together by any convenient clamping device, exemplified in Figure 1 by the spring clamp 23 mounted on the base 24, lateral displacement of adjacent couplings being prevented by interengagement of the flange 25 on the end wall of each outlet section engaging in the recess 26 of its adjacent inlet fitting end wall.

Turning now to Figures 2 and 3, it will be seen that within the interior of the coupling there has been included certain spring-loaded valve mechanism. The function of the valve mechanism is to seal both sections of the coupling on disconnection; the sections per se, however, are similar to the individual sections shown in Figure 1 and therefore similar reference numerals have been employed where applicable.

Extending coaxially of the inlet fitting 15 is a fixed, rigid, valve stem 27 which at its outer end mounts the valve head 28. The valve head 28 is fixed, and the movable valve element is constituted by the annular seating 29 which is urged towards the valve head by the compression spring 30. Interposed between the compression spring 30 and the annular valve part 29 is a pressure plate 31 which serves to compress the packing washer 32.

Extending axially of the hollow outlet fitting 17 is a valve spindle 33 on which the movable valve head 34 is slidable axially, being urged by means of the compression spring 35 towards the fixed valve seating 36.

In reference to Figure 3, it is important to note that in the sealed condition when separated the valve faces are flush, and thus the opposed sections can be presented to each other with virtually complete air exclusion, which feature is a point of considerable importance in dealing with hydraulic circuits in which the medium employed is constituted by liquid which needs to be kept entirely free of air.

Referring now to Figures 4 to 8, the essential function of the clamp device is to effect axial movement of the plunger member 37 in order to secure or to permit disengagement of the coupling members. It can be assumed that the coupling members engaged by the clamp are similar to those illustrated with reference to Figures 2 and 3, and therefore the associated inlet and outlet fittings have been indicated, respectively, by the reference numerals 15 and 17. The plunger 37 acts in compression to press the assembled series of fittings 15 and 17 against the end plate 38. Mounted at one end of the baseboard 39 is a bracket 40 which includes two laterally-spaced upstanding cheeks 41. The cheeks 41 each provide a bearing for a centre boss part 42 which laterally outwardly terminates in an hexagonal flange 43. The boss 42 mounts the eccentric pin 44 which rides in the slot 45 of the plunger stem. It will thus be realised that turning the boss 42 about its axis effects axial movement of the plunger 37. Turning of the boss 42 is effected by the clamp handle 46. The clamp handle 46 is of strip material bent back upon itself so that its ends come together, the ends being enlarged to provide the laterally-spaced cheeks 47, each of which fits on one of the laterally-projecting hexagonal ends 43 of the boss 42. It thus follows that with the clamp handle 46 in the full-line position shown in Figures 4 and 5 the eccentric pin 44 is in an extreme position in which it urges the plunger 37 as far forward as it can go on its compression stroke. Conversely, if the clamp handle 46 be swung anticlockwise into the dotted-line position at Figure 5, the eccentric pin 44 is in its other extreme position whereby the compressive loads holding the associated sections 15 and 17 together is entirely relieved.

With couplings of the form shown with reference to Figure 2, relief of the compression effects separation of the associated couplings under the influence of the springs 30 and 35.

Certain other details of the clamp are made more clear with reference to Figures 7 and 8. Thus, it will be seen from Figure 7 that there is provided on the periphery of the hollow fittings 15 and 17 a plurality of diametrically-opposed grooves 48. The purpose of the grooves 48 is to receive the longitudinally-extending locating bars 49 and 50. The bottom locating bar 49 is secured between the pivot 51 on the bracket cheeks 41, and the pivot 52 on the end bracket 53 which mounts the end plate 38 (see Figure 5 for the pivots 51 and 52). On the other hand, the upper locating bar 50 is supported at its ends by the arms 54 and 55 (see Figure 4) which are respectively pivoted to the upper ends of the upstanding brackets 56 and 57. For disengagement of the upper locating bar 50 from the cooperating groove 48, the arm 54 is swung up clockwise towards the dotted-line position of Figure 8 against the force exerted by the tension spring 58. At its ends the locating bar 50 has the cross-pieces 59 and 60 (see Figure 4) which respectively snap into engagement behind the inclined surfaces 61 and 62—more clearly seen in Figure 5.

It will be evident that so long as the clamp handle 46 is in the full-line position shown in Figure 5 it prevents disengagement of the locating bar 50 on account of the fact that the arm 54 cannot be swung upwards until the handle 46 has been raised; and, to provide for absolute security against accidental release, the clamp handle is secured in its full-line position by means of the locking pin 63 (see Figures 4 and 5). The whole assembly of the clamp ensures that with the clamp handle secured in the full-line position shown in Figures 4 and 5 the associated series of sections 15 and 17 are securely located against axial displacement; and, in addition, by means of the locating bars cooperating with one or other of the series of grooves 48 the angular disposition of the associated pipe connections is also made secure. Should it be desired to alter the angular relationship of any one or more of the series of pipe connections, it suffices to adjust the associated inlet or outlet fitting 15 or 17, as the case may be, to the angular setting, and then to engage the locating bars 49 and 50 each in the nearest groove 48.

The distance between the face of the plunger 37 and the face of the end plate 38 is of course determined by the number of associated sections to be secured by the clamp, and thus if more than a standard number of associated units are to be secured it is necessary to increase the distance between the bracket 40 and the fitting which mounts the end plate 38, choosing the locating bars 49 and 50 correspondingly of suitable length. If a small degree of axial adjustment is required, the end plate 38 can be adjusted by manipulation of the threaded sleeve 64. The end plate 38 is located by the locating bars 49 and 50 (see Figure 8) and finally locked by insertion of the locking pin 65.

Passing now to the construction shown in Figures 9, 10 and 11 of the drawings, the eccentric-operated plunger arrangement shown and described with reference to Figures 4 to 8 has been replaced by a fluid pressure jack operated plunger, which it is now proposed to describe.

The jack plunger 66 has at its outer end a pressure member 67 which is urged axially towards the end plate 68 to load the assembly of coupling units in compression. The plunger 66 has a piston 69 fitting the bore of the jack cylinder 70. The plunger 66, together with its piston 69, slides axially upon the internal sleeve 71 which is of hollow construction; but rotation of the plunger 66, together with the piston 69, about the axis of the sleeve 71 is prevented by the peg 72 which can move along the keyway 73. Fast on the sleeve 71 is a barrel cam 74 which has cut in its periphery the cam grooves 75 and 76, which respectively engage diametrically-opposed fixed pins 77 and 78. Externally of the cylinder 70 the plunger 66 carries a handle 79 by means of which the plunger, and through it the sleeve 71 and barrel cam 74 are rotatable. Rotation of the handle 79 in the direction of the arrow shown in Figure 11 effects rotation of the barrel cam 74. Due to the fact that the pins 77 and 78 are fixed and in engagement with the grooves 75 and 76 it follows that rotation of the barrel cam 74 moves it endwise, taking with it the internal hollow sleeve 71. Axial movement of the hollow sleeve to its rearward limit depresses the spring-loaded ball valve 80 and permits fluid pressure from a conveniently available source to flow along the fluid pressure supply pipe 81, then along the bore of the hollow sleeve 71, and out through the end of the duct 73 (see Figure 10) to act against the internal face 82 of the plunger and start to move it axially. By the time the plunger 66 has moved a short distance the pressure face 83 of the piston 69 is opened to the duct 73 and increased pressure area is therefore available. The whole assembly is devised to ensure that the coupled units are squeezed fully together within an extent of travel not greater than the travel of the plunger 66 within the cylinder 70.

It will be noted that in Figures 9 and 10 the plunger 66 is retracted and the jack is not yet subject to the pressure available at the pipe 81. As stated, rotation of the handle 79 in the direction of the arrows (see Figure 11) operates the jack for clamping, as has been above described; and by the time the plunger 66 has moved forward to the required extent the handle 79 has moved forward sufficiently far to enable the projection 84 integral with and diametrically opposed to the handle 79 to be engaged with the cam face 85 so as to lock the jack plunger positively against retraction movement, so that even should fluid pressure behind the piston pressure face 83 fail the plunger 66 still cannot retract to permit separation of the sections. When the projection 84 has been engaged with the cam face 85 the hole 86 (see Figure 10) through the plunger 66 is in register with the fixed hole 87, and the plunger is finally securely locked by insertion of the pin 88, which is itself secured against inadvertent withdrawal by means of the safety-pin 89.

To release internal pressure behind the piston pressure face 83, it suffices to withdraw the locking pin 89 and then to twist the handle 79 to the position shown in full lines in Figure 11, thus setting the parts as shown in Figures 9 and 10 with the tail of the hollow internal sleeve 71 clear of the port 90 to permit exhaust of internal pressure along the pipe 81, the plunger 66 being urged back by light pressure applied through the handle 79 if the sections do not at once separate under the influence of their internal loading due to the associated system pressure and/or the self-sealing internal valves, if such are provided.

As shown with reference to Figures 4 and 5, the whole assembly is secured upon a baseboard, and for convenience the baseboard has been represented in Figures 9 and 10 by the reference numeral 39. Likewise, in Figures 9, 10 and 11 where the corresponding parts appear (e. g. inlet and outlet fittings 16 and 17 and locating bars 49 and 50) they have been indicated where necessary by the same reference numerals as those employed in Figures 4 and 5.

In the modification shown with reference to Figure 12, the means for locating the sections against rotation each about its axis is varied from the arrangement described with reference to Figures 4 to 8 (compare Figures 7 and 12). Thus, it will be seen that in the modified arrangement anchor bars 92, 93 (which are virtually the counterpart of the locating bars 49, 50 of Figures 5, 7 and 8) mount the segments 94, partially embracing the sections. The bars 92 and 93 are respectively located each in a bore through the thickened portions 95, 96; and the arrangement provides a continuous range of adjustment within the available limits between the segments. The ends of the bars 92 and 93 may be secured to the clamp fittings in the same way as are the locating bars 49 and 50 previously described, and may provide a degree of resilience such as will enable the sections to be snapped into position between the segments and then to be securely held thereby due to the tension inherent in the bars. If desired, the bars 92 and 93 and/or the segments 94 may be spring-loaded together to facilitate such a mode of engagement.

In all its aspects the invention provides a simple and satisfactory arrangement for grouping pipe-lines, for instance where they pass through a bulkhead, which may, if desired, constitute a baseboard for mounting the clamp. The arrangement permits turning of the individual sections each about its axis so that an inlet or an outlet pipe from each coupling of the series can flow away at practically any desired angle. The arrangement of pipelines may in many cases be greatly simplified by grouping the connections, and any particular line requiring servicing or attention may be serviced without materially displacing the others of the system.

The self-sealing mechanism described with reference to Figures 2 and 3 of the drawings can be employed in all cases where it is required to prevent substantial leakage of fluid on disconnection of two sections of any coupling. The degree of air exclusion which is provided for on reengagement of the coupling is of such order that it may ordinarily suffice to avoid the necessity of bleeding, which is otherwise a necessary operation when a pipeline of an hydraulic-actuated system has been broken.

In most cases with ordinary actuated systems, as employed for instance in aircraft, the leverage provided by the substantial lever 46, shown in Figures 4 and 5, is adequate to engage fully all the sections of the assembly of couplings; but in all cases where the pressure of the system is such as to require very considerable effort to effect full engagement of the couplings against the pressure of the system it is preferred to employ the fluid pressure actuated clamp described with reference to Figures 9, 10 and 11.

What I claim is:

1. In a pipe coupling including a plurality of pairs of interfitting elements, each pair establishing a passage therethrough, said elements being exteriorly grooved, a base board, a stationary end plate supported from said base board, a compression plate supported from said base board in spaced relation with respect to said end plate so that said pairs of interfitting elements may be held between said plates, means for moving said compression plate toward said end plate to compress said interfitting elements therebetween, and a plurality of bars supported from said base board and extending between said plates, said bars being received in the grooves in said pairs of members and serving to hold the same against angular movement in a plane normal to the plane of movement of said compression plate.

2. Apparatus for holding a plurality of interfitting pipe coupling elements in passageway establishing position which comprises, an end plate assembly including a portion adapted to engage one pipe coupling element, a pressure plate adapted to engage another pipe coupling element, means for moving said pressure plate toward the engaging portion of said end plate assembly to press interfitting coupling elements therebetween, means for securing a portion of said pressure plate moving means and a portion of said end plate assembly in a fixed position relative to each other, and means extending between a secured portion of the pressure plate moving means and a secured portion of said end plate assembly for restraining coupling elements against displacement radially of the axis of movement of said pressure plate when said pressure plate is moved toward said end plate.

3. Apparatus for holding a plurality of interfitting pipe coupling elements in passageway establishing position which comprises, an end plate assembly including a portion adapted to engage one pipe coupling element, a pressure plate adapted to engage another pipe coupling element, means for moving said pressure plate a fixed distance toward the engaging portion of said end plate assembly to press interfitting coupling elements therebetween, means for securing a portion of said pressure plate moving means and a portion of said end plate assembly in a fixed position relative to each other, and means for adjusting the position of at least that portion of one of said plates against which an interfitting element rests, whereby to render adjustable the amplitude of the space occupied by the pairs of interfitting coupling elements so that pairs of different sizes or different numbers of pairs may be firmly gripped by moving the pressure plate its fixed distance toward said end plate assembly.

4. Apparatus as claimed in claim 3 in which the means for moving said pressure plate includes a stationary element and an element movable with respect thereto and means for locking said two elements against relative movement in the relative position assumed thereby when the pressure plate is moved to pressing position.

5. Apparatus for holding a plurality of exteriorly grooved interfitting pipe coupling elements in passageway establishing position which comprises, an end plate assembly including a portion adapted to engage one pipe coupling element, a pressure plate adapted to engage another pipe coupling element, means for moving said pressure plate toward the engaging portion of said end plate assembly to press interfitting coupling elements therebetween, means for securing a portion of said pressure plate moving means and a portion of said end plate assembly in a fixed position relative to each other, and a plurality of bars extending between a secured portion of the pressure plate moving means and a secured portion of said end plate assembly, said bars being adapted to occupy exterior grooves in the coupling elements for restraining the latter against angular movement in a plane normal to the plane of movement of said pressure plate.

6. Apparatus for holding a plurality of interfitting pipe coupling elements in passageway establishing position which comprises, an end plate assembly including a portion adapted to engage one pipe coupling element, a pressure plate adapted to engage another pipe coupling element, means for moving said pressure plate toward the engaging portion of said end plate assembly to press interfitting coupling elements therebetween, means for securing a portion of said pressure plate moving means and a portion of said end plate assembly in a fixed relative position, and a pair of resilient saddle segment members extending between a secured portion of said pressure plate moving means and a secured portion of said end plate assembly, said resilient members having gripping surfaces for engaging the exterior surfaces of the coupling elements for restraining the latter against angular displacement in a plane normal to the plane of movement of said pressure plate or displacement angularly of the axis of the plurality of coupling elements.

7. Apparatus for holding a plurality of interfitting pipe coupling elements in passageway establishing position which comprises, an end plate assembly including a portion adapted to engage one pipe coupling element, a pressure plate adapted to engage another pipe coupling element, means for moving said pressure plate toward the engaging portion of said end plate assembly to press said interfitting coupling elements therebetween, means for securing a portion of said pressure plate moving means and a portion of said end plate assembly in a fixed relative position, means extending between a secured portion of said pressure plate moving means and a secured portion of said end plate assembly for restraining coupling elements against rotative angular or non-axial displacement under compression, means for locking said restraining means in restraining position, means constituting a part of said pressure plate moving means for holding the locking means for said restraining means in locking position when the means for moving the pressure plate is in plate pressing position, and means for locking said last-named means in its holding position.

8. Apparatus as claimed in claim 3 in which the means for moving the pressure plate includes a cam and means for pivotally mounting the cam on the secured portion of said pressure plate moving means in a position to act upon the pressure plate and means for rotating the cam to bring about movement of the pressure plate toward and away from the end plate assembly.

9. Apparatus as claimed in claim 3 in which the means for moving the pressure plate comprises a cylinder secured in fixed position with respect to said end plate assembly, a piston in said cylinder acting on said pressure plate, means for charging said cylinder with a pressure fluid and means for limiting the amplitude of the stroke of said piston under compression.

LOUIS THOMAS HUTCHISON GREIG.